July 20, 1954 V. J. WINKEL 2,684,149
FEEDING CHAIN FOR LUMBER GLUING MACHINES
Original Filed Sept. 6, 1947 4 Sheets-Sheet 1

INVENTOR.
VICTOR J. WINKEL
BY
Buckhorn and Cheatham
Attorney

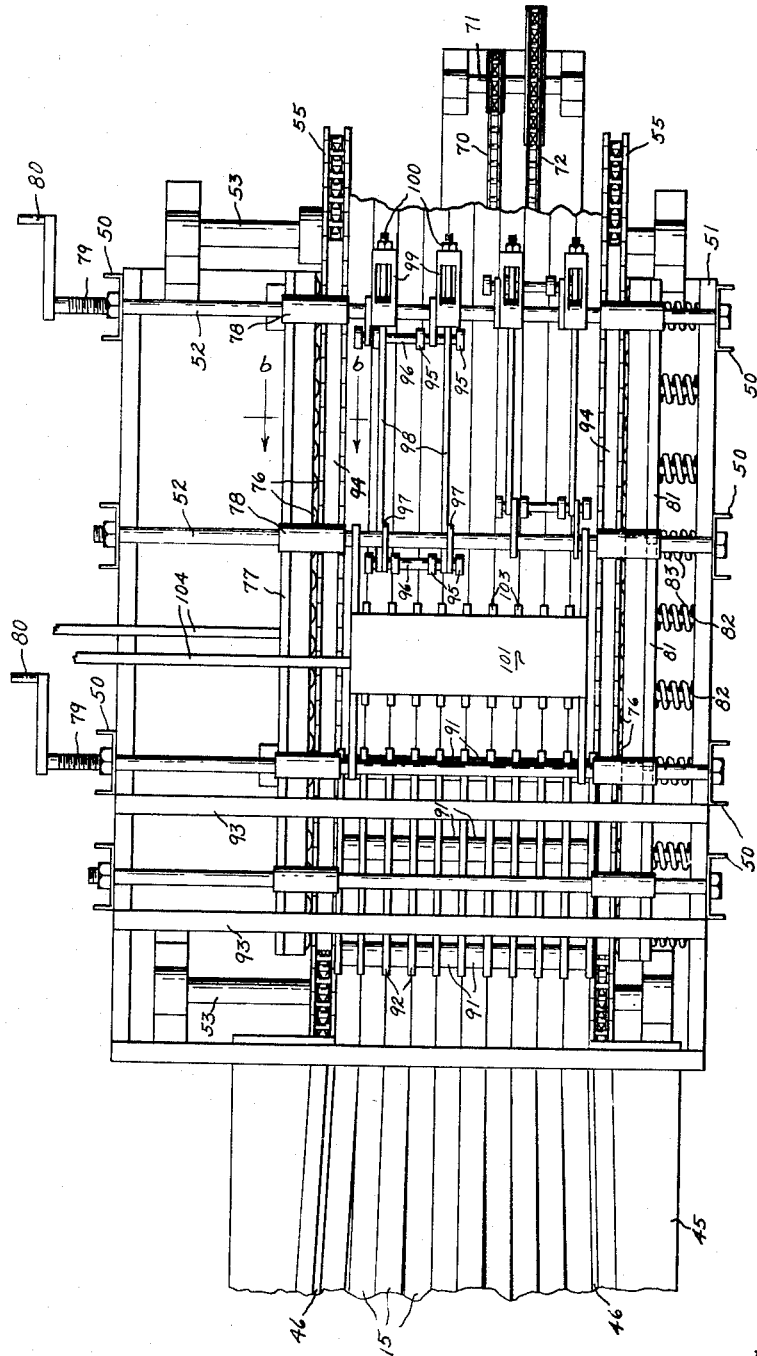

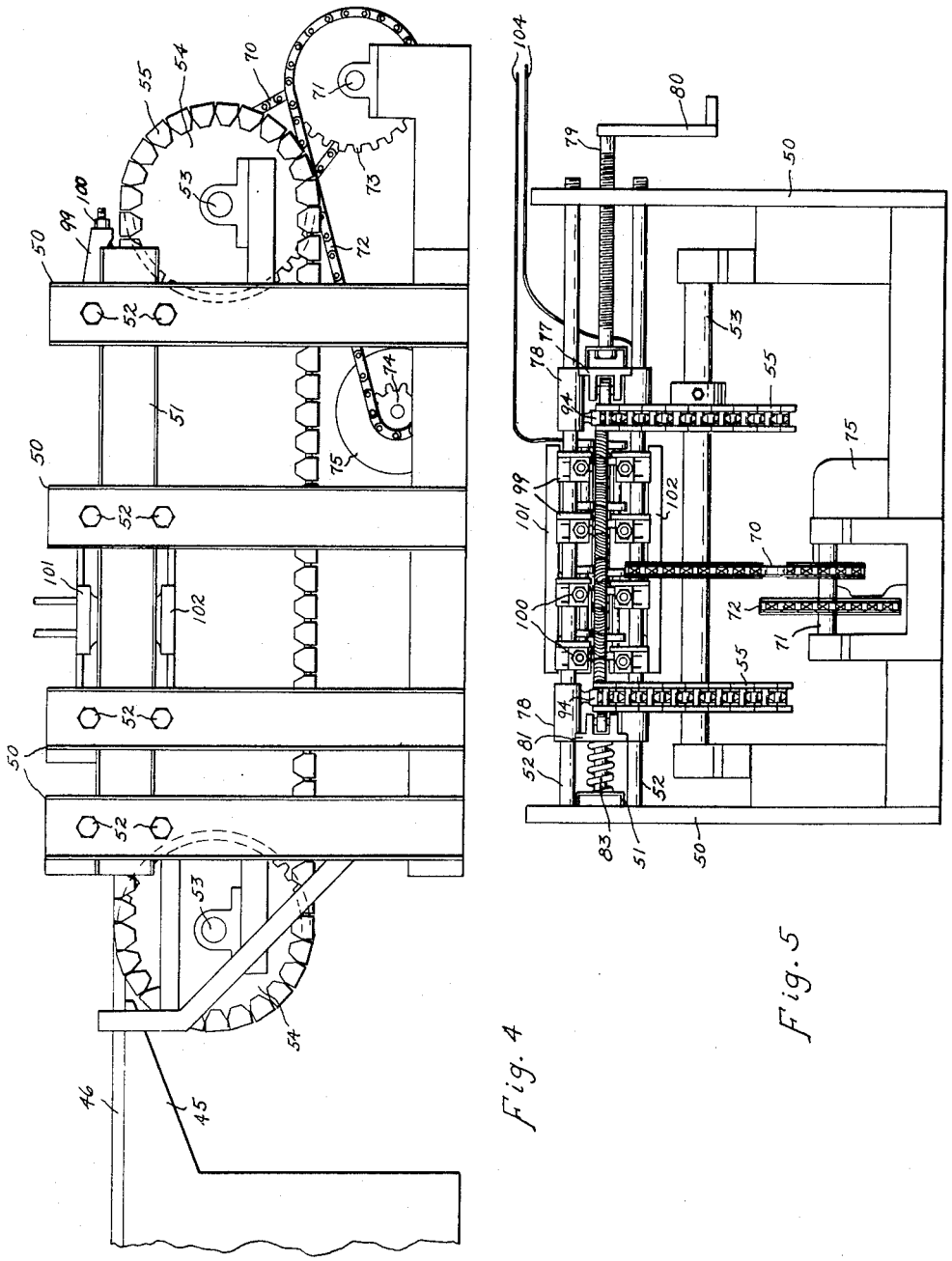

July 20, 1954          V. J. WINKEL          2,684,149

FEEDING CHAIN FOR LUMBER GLUING MACHINES

Original Filed Sept. 6, 1947          4 Sheets-Sheet 4

INVENTOR.
VICTOR J. WINKEL
BY
Buckhorn and Cheatham
Attorney

Patented July 20, 1954

2,684,149

UNITED STATES PATENT OFFICE 2,684,149

FEEDING CHAIN FOR LUMBER GLUING MACHINES

Victor J. Winkel, Portland, Oreg., assignor to Laminated Lumber Products, Inc., Portland, Oreg.

Original application September 6, 1947, Serial No. 772,565. Divided and this application April 25, 1952, Serial No. 285,010

3 Claims. (Cl. 198—162)

The present application is a division of the application of Victor J. Winkel, Serial No. 772,565, filed September 6, 1947 now Patent No. 2,617,456.

My present invention comprises a machine for gluing lumber scraps together to form large boards, thus providing means to utilize waste material in lumber mills or factories utilizing lumber. It is well known that in many industries scraps of lumber of good quality, except that they are of irregular dimensions, are sold for their salvage value or burned. The principal object of the present invention therefore is to reduce lumber wastage by utilizing mill scrap.

One object of the present invention is to provide large boards capable of being utilized as wall, ceiling or floor panels, or as the sides of boxes or the like, and in many other applications where larger boards than normally available are desirable or useful. I thus am able to provide a product having great value from material normally wasted.

An object of the present invention is to provide means for forming a continuous sheet of board material which may be cut into any desired lengths, by joining small board sections of irregular lengths together.

A further object of the present invention is to provide a new and improved edge gluing mechanism for applying glue to the edges of a plurality of adjacent board sections which are to be joined edge to edge.

A further object of the present invention is to provide a board fabricating machine in which boards are glued edge to edge, and in which the setting of the glue is achieved in rapid order.

A further object of the present invention is to provide a machine for making boards of smaller board sections, which may be quickly and easily adjusted in order to form boards of various widths.

The foregoing and other objects and advantages of the present invention will be more readily apparent from an inspection of the accompanying drawings taken in connection with the following specication wherein like numerals refer to like parts throughout.

In the drawings Fig. 1 is a plan view of a portion of the present invention disclosing the assembling table and the edge gluing mechanism;

Fig. 3 is a plan view of the portion of the machine in which the drying or setting of the adhesive is accomplished;

Fig. 4 is a side elevation of the mechanism disclosed in Fig. 3;

Fig. 5 is an end view taken from the right end of Fig. 4;

Figure 1:
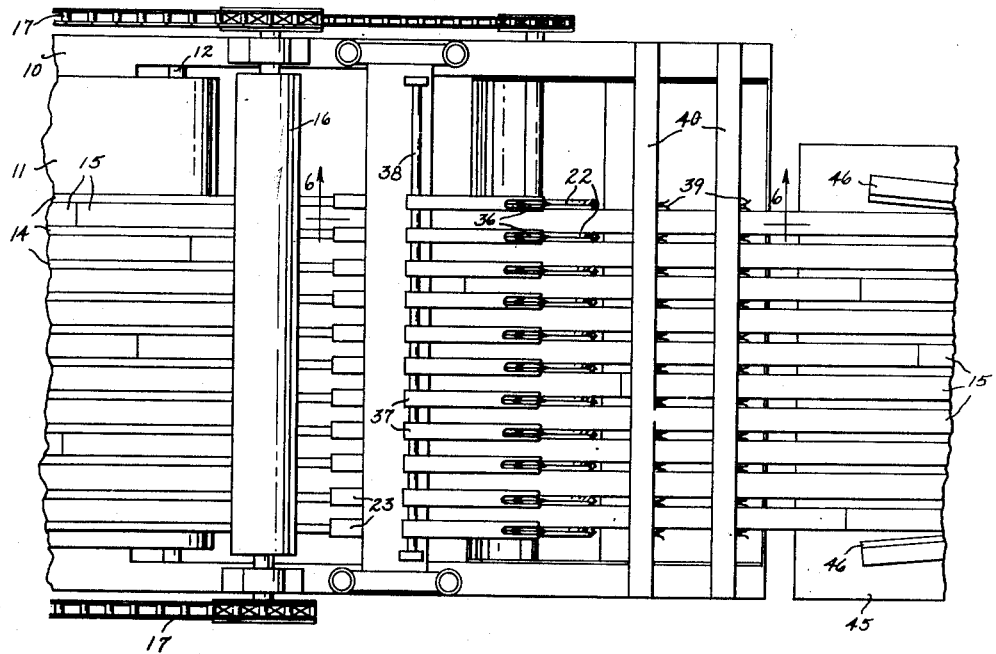
Figure 2:
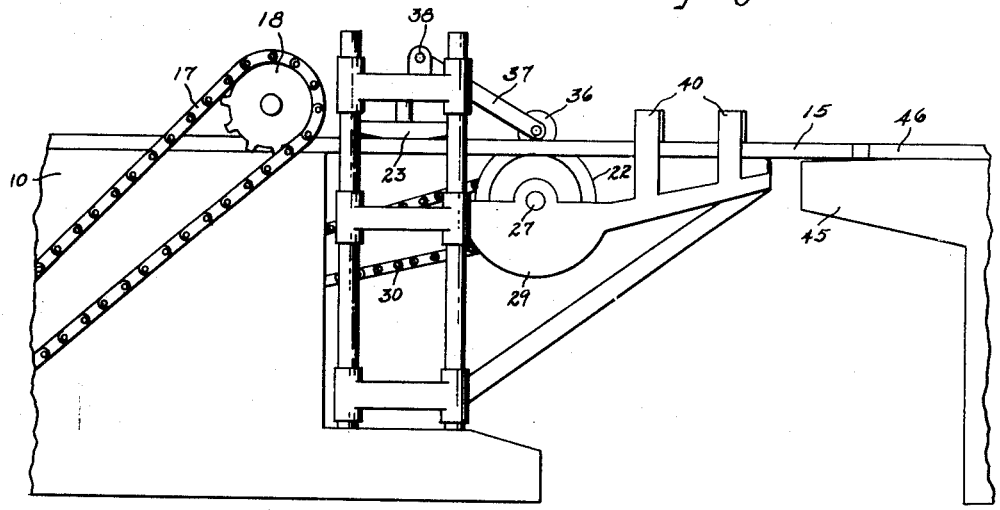
Fig. 2 is a side elevation of the mechanism disclosed in Fig. 1.
Figure 6:
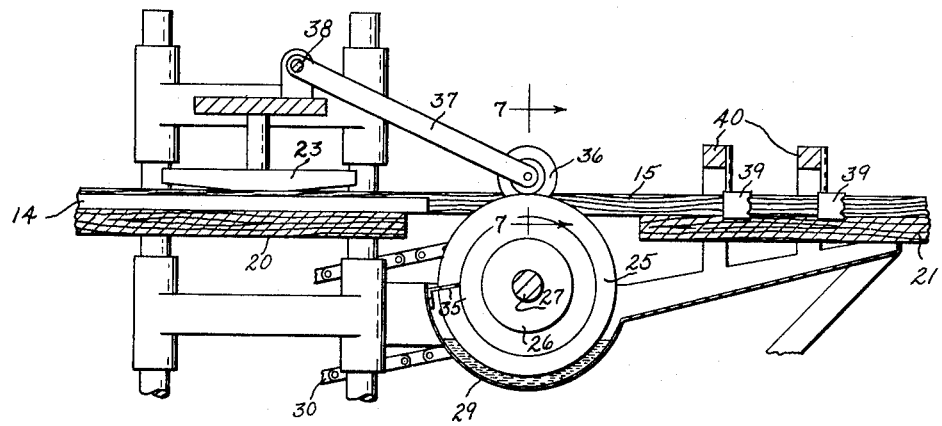
Fig. 6 is an enlarged detail view of the gluing mechanism taken substantially along line 6—6 of Fig. 1.

The machine comprises an assembly section 10 upon which is positioned a wide endless belt 11 extending over an end roller mounted upon a shaft 12. The belt 11 is driven by suitable motive means (not disclosed) so as to have a lineal speed in the range of 2 to 10 feet per minute. Positioned above the belt 11 are a plurality of parallel guide bars 14 which extend over the top of the table to provide troughs between which may be dropped sections of boards 15 of suitable standard width and depth but of any irregular length. Adjacent the end of the belt 11 and above the boards is positioned a driving roll 16 having a rubber or canvas covering thereon which is driven by suitable means such as the sprocket chains 17 and gears 18, the chain extending to suitable motive means such as the motor for driving the belt 11. The boards are shoved forwardly from the end of belt 11 by the roller 16, across the top of intermediate supporting plates 20 and 21 between which are mounted a plurality of glue applying members 22, being held down against any upward thrusting tendency of the glue applying members by a plurality of pressure shoes 23.

The glue applying members each comprise a pair of flexible discs 25 retained between collars 26 mounted upon a shaft 27 extending transversely of the machine. The outer surfaces of the discs 25 adjacent their peripheries are beveled to provide flat surfaces 28. The surfaces 28 are immersed in adhesive contained within a trough 29 extending transversely of the machine. Any suitable adhesive may be positioned in the trough but I prefer a type of adhesive which is thermo-setting. The shaft 27 is driven by suitable means such as the sprocket chain 30 connected to the feeding drive.

As the discs 25 rotate the surfaces 28 pick up adhesive which is evenly spread by suitable spreaders 35 mounted on the edge of the trough 29 beneath the plate 20. The flat surfaces of the discs are so positioned as to extend upward between the adjacent edges of the board sections 15.

A spreader disc 36 having a wedge-shaped cross section is mounted upon an arm 37 extending from a cross bar 38 and is so positioned between the discs 25 as to spread the beveled edges thereof outwardly at their uppermost extremities so as to bring the adhesive bearing surfaces thereof into contact with the adjacent edges of the board sections 15 to thereby coat the sections with adhesive. Shortly beyond the adhesive applying members there are preferably positioned a plurality of scraper members 39 mounted upon cross-rods 40 so as to lie between the board sections 15. The scraper members (Fig. 1) preferably comprise U-shaped springs with notched ends spread outwardly in order firmly to contact the surfaces of the boards and spread the adhesive over the surfaces thereof. After leaving the adhesive appliers the board sections are received on an intermediate table 45 provided with edge guiding members 46 which converge toward each other to an extent such that the boards are brought together to form a single board of the width of the plurality of boards.

Figures 7, 8, 9:
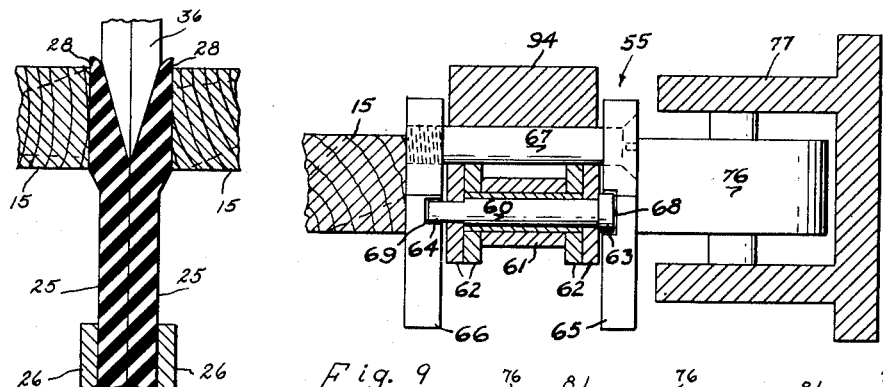
Fig. 7 is an enlarged section taken along line 7—7 of Fig. 6.
Fig. 8 is an enlarged detail view of a portion of the mechanism disclosed in Fig. 3.
Fig. 9 is an enlarged detail view taken substantially along line 9—9 of Fig. 3.
Figure 10:
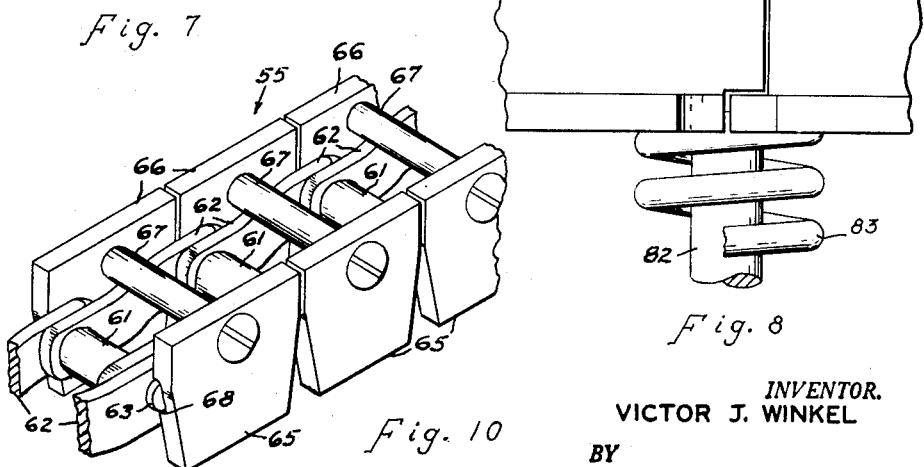
Fig. 10 is a view in perspective of a portion of one of the material feeding chains.

The boards are now received in the adhesive setting mechanism disclosed in Figs. 3, 4 and 5. This mechanism comprises a suitable frame including upright channels 50 and longitudinal channel members 51 connected by transverse tie bolts 52. Suitable brackets mounted at each end of the mechanism support a pair of transverse shafts 53, each of which carries a pair of sprocket gears 54, one at each side of the machine. About each longitudinally opposed pair of sprocket gears 54 there is extended a flexible sprocket chain 55. The chain, as more clearly detailed in Fig. 9, comprises a standard type of sprocket chain including pins 60 extending through spacers which may be clinched to the adjacent ends of each pair of longitudinally extending links 62 and which are preferably surrounded by sprocket engaging rollers 61. The links 62, as more clearly seen in Fig. 10, spread outwardly so as to embrace the ends of the succeeding pair of links 62 and the pin 60 inserted therethrough to form the chain. The pins 60 may be provided as usual with large heads 63 at one end and a reduced tip 64 at the other, the reduced tip 64 being normally provided with an opening for the reception of a cotter pin or the like. In the present invention the cotter pin may be eliminated since the pins 60 are retained by faceplates 65 and 66 straddling each set of links 61 and retained thereon by a large, flat-headed screw 67 extending across the space above the links 62 and having its head countersunk into the plate 65. The upper portions of each plate 65 and 66 are substantially rectangular but the lower portions thereof are tapered inwardly so that the lower ends thereof are considerably narrower than the upper ends in order that the chain may pass about sprockets as seen in Fig. 4. In order to hold the assembly together the plates 65 are provided with recesses 68 of such size as to receive the heads 63, the recesses extending inwardly from the upper portions of the tapered faces of the plates, and the plates 66 are provided with similar recesses 69 of such shape and location as to receive the tips 64 of pins 60.

The chains 55 are driven by suitable means such as a sprocket chain 70 extending about a sprocket gear on the forward shaft 53 and a sprocket gear on an intermediate shaft 71, and a second sprocket chain 72 extending about a sprocket gear 73 on shaft 71 and a sprocket gear 74 on a motor 75. The gears are so arranged as to drive the chains 55 at a speed slightly less than the lineal speeds of the belt 11 and the roller 16. The boards 15 are thereby forced into abutting relationship with each other as the boards approach the chains 55, and the belt 11 and roller 16 slip slightly upon the surfaces of the boards so as to permit this differential in speed.

In order to accommodate different numbers of boards 15 so as to provide for the fabrication of various widths of finished boards the right chain 55 is shiftable laterally, the sprocket gears upon which this chain is mounted being slidable longitudinally of the shaft 53. In order to prevent the chains from spreading between the sprocket gears the outermost surfaces of the outermost plates 65 are engaged by a plurality of rollers 76 mounted in channel shaped members extending longitudinally of the machine. At the right side of the machine the rollers 76 are mounted in a rigid channel shaped member 77 which is affixed to sleeves 78 guided upon the cross ties 52 and movable thereon by screws 79 passing through the uprights 50 and provided with adjusting cranks 80. At the left side of the machine the rollers 76 are mounted in a plurality of separate sections 81 guided for lateral movement upon guide rods 82 about which are coiled heavy compression springs 83. The separate sections 81 may therefore bow the chain 55 inwardly if slight variations in the overall width of the finished board should occur. The chains are prevented from shifting vertically by longitudinal guide bars 94 mounted on the sleeves 78.

In order to hold the individual boards in position a plurality of rollers 91 are mounted on suitable cross shafts fixed in supports 92 depending from cross braces 93, each of the rollers being adapted to engage the upper surface of a row of boards 15. The supports 92 and rollers 91 are suitably fashioned (not detailed herein) to permit the removal of, or the addition of, the proper number of rollers for the number of rows of boards being fabricated into a single board. At the outlet end of the machine a plurality of rollers 95 are mounted upon shafts 96 supported in links 97 depending from the cross ties 52. Pairs of the shafts 96 are connected together by longitudinally extending links 98 which extend through brackets 99 mounted on one of the cross ties 52 and are threaded for the reception of nuts 100. The nuts may be tightened or loosened to cause angular shifting of the rollers 95 about the cross ties 52 so that various depths of board may be accommodated. The rollers 91 are also preferably adjustable vertically by any convenient means (not herein illustrated) so that the entire machine may be adjustable to accommodate various depths of board.

In the gap between the rollers 91 and the rollers 95 I position a pair of electrode assemblies 101 and 102 including longitudinally extending bars 103 adapted to bear upon the surfaces of the boards adjacent the longitudinal edges thereof. The electrodes 101 and 102 are connected by suitable cables 104 to a source of high frequency current (not herein illustrated) by means of which high frequency current is caused to pass through the boards and effect setting of the adhesive by the heating effect thereof. It is to be appreciated that other types of heating means or drying means could be substituted for the high frequency electrodes, but such a substitution would entail the material lengthening of the machine and would result in slower operation. By the use of high frequency heating means the adhesive is firmly set at relatively high speeds.

After the completed board leaves the adhesive setting machine it passes through suitable transverse cutting mechanism, such as a flying shear or a flying rotary saw (not herein illustrated), so as to be cut into the desired lengths.

It is to be appreciated that various details are herein illustrated schematically since many possible modifications of such details may occur to those skilled in the art. All such modifications in detail, and modifications in arrangement of the machine, as come within the true spirit and scope of the appended claims are considered to be a part of my invention.

I claim:

1. In a machine for making laminated boards, a conveyor chain adapted to grip the boards and press the laminations together comprising a sprocket chain having link retaining pins protruding from each side thereof, a plurality of faceplates assembled on the sprocket chain in opposed pairs, a threaded member separably connecting each pair of faceplates together and extending across the conveyor chain above the portion of the sprocket chain embraced thereby, and each faceplate having recesses therein for reception of the protruding portions of adjacent pairs of said pins.

2. A chain comprising links and link retaining pins protruding from each side at the ends of each link thereof, a plurality of faceplates assembled on the chain in opposed pairs, a threaded member separably connecting each pair of faceplates and extending across the chain above a link thereof, each faceplate having a pair of inwardly open, edge recesses therein for reception of the protruding portions of adjacent pairs of said pins, said faceplates providing aligned broad surfaces at the opposite sides of said chain.

3. A chain comprising a plurality of endwise connected sprocket chain links and transverse link connecting pins protruding from each side of the chain at the ends of each link, a pair of faceplates separably mounted upon each of said links, said faceplates being mounted in opposed pairs covering the sides of the chain, each of said faceplates having a plane, uninterrupted, outer surface, each of said faceplates having oppositely inclined end surfaces whereby said chain may pass around sprockets, each of said faceplates having a pair of recesses each extending partially therethrough from its inner surface and from an end surface for reception of a portion of a protruding end of one of said pins, and a screw extending laterally through one of a pair of faceplates and threadedly engaged in the other faceplate of the pair, said screw passing above the link, and the head of said screw being countersunk flush with the outer surface of said one faceplate and the threaded end thereof terminating within said other faceplate.

References Cited in the file of this patent

UNITED STATES PATENTS

| Number | Name | Date |
|---|---|---|
| 1,826,351 | Hoefen | Oct. 6, 1931 |
| 1,882,855 | Melin | Oct. 18, 1932 |
| 2,339,761 | Bruestle | Jan. 25, 1944 |